March 27, 1934.    G. F. WEBB    1,952,189
DIRECTION INDICATOR
Filed April 15, 1933
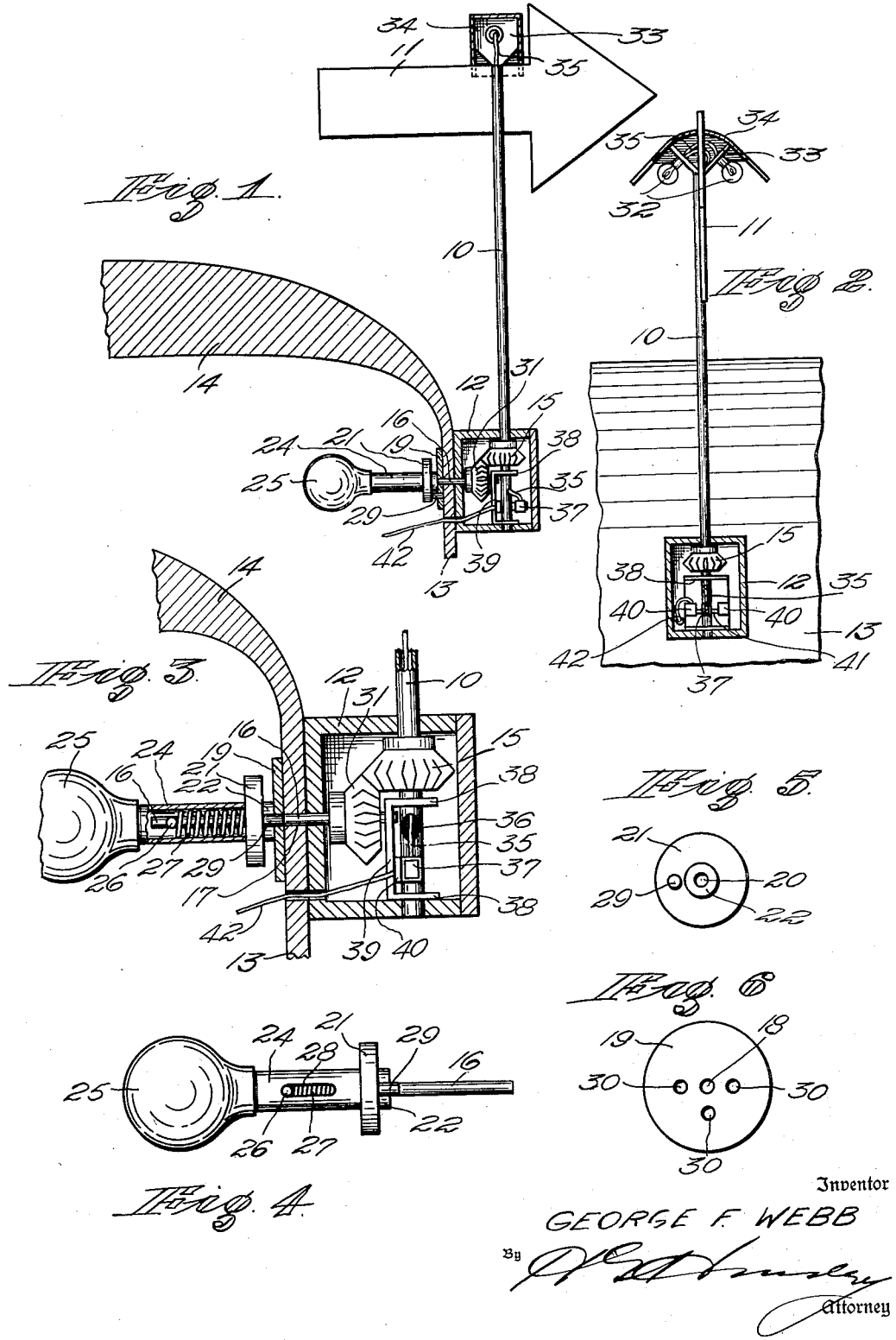
Inventor
GEORGE F. WEBB Patented Mar. 27, 1934

1,952,189

UNITED STATES PATENT OFFICE 1,952,189

DIRECTION INDICATOR

George F. Webb, Hamilton, Ontario, Canada

Application April 15, 1933, Serial No. 666,263

1 Claim. (Cl. 116—47)

This invention relates to improvements in direction indicators for motor vehicles and the like, consisting of a vertically disposed rotatable shaft mounted on or close to the forward part of the vehicle top or roof and carrying at the top so it can be viewed from all directions above the roof a signal vane, and means for rotating the shaft in right or left direction comprising, in part, a second shaft partially enclosed in a slidingly mounted sheath terminating in a knob and by which the second shaft is revolved, and a selective device in conjunction with the sheath for temporarily fixing the position of the signal.

One important object of the invention is to provide a direction indicator for vehicles with the signal thereof well above the vehicle roof in order to permit it to be recognized at all angles.

Another important object is to provide means underneath the vehicle roof to manipulate such a signal.

A third important object is to provide means for selectively fixing or setting the signal in three positions from within the vehicle.

A fourth important object is to provide novel means for night illumination of the signal automatically when it is turned to the positions indicating right or left intent.

A fifth important object is to provide a device of the class specified which will be effective, durable, simple, and inexpensive to produce.

With the above and other objects in view as will be hereinafter apparent, the invention consists in general of certain novel details of construction and combinations of parts hereinafter fully described, illustrated in the accompanying drawing and specifically claimed.

In the accompanying drawing like characters of reference indicate like parts in the several views, and:

Figure 1 is a side elevation, partially in cross-section, of a direction indicator constructed in accordance with this invention and as connected to the forward end of a vehicle roof;

Figure 2 is a front elevation, also partially in cross-section, of Figure 1;

Figure 3 is an enlarged cross-sectional side elevation of the signal actuating mechanism;

Figure 4 is an enlarged view of the knob, sheath, shaft and part of the selective device assembly;

Figure 5 is an enlarged face view of the selector boss or bolt together with its mounting; and, Figure 6 is an enlarged face view of the selector plate.

In the present embodiment of the invention the vertical hollow shaft 10 supports the signal vane 11 shown in this instance in the representation of an arrow signifying direction. While the vehicle is bound on an obvious course the arrow is disposed longitudinally of the vehicle, that is, pointing forwardly as indicating that no deviation of the vehicle is contemplated, but when the arrow is directed laterally of the vehicle, to the left or to the right, it indicates that a turn is to be made in the general direction in which the arrow is aimed.

The hollow shaft 10 is journalled in the gear box 12 secured to the windshield lintel 13 of the vehicle superstructure just beneath the point of merger with the vehicle top 14, and fast on this shaft is a driven bevel pinion 15. A horizontal shaft 16 bearing in an upright portion of the gear box 12 and extending to the inside of said superstructure through passages 17 in said lintel, 18 in the selector plate 19, and 20 in the selector bolt mounting disc 21. Fast on one side of the disc 21 is a spacer collar 22 bearing against the plate 19, and fast on the opposite side of said disc is the sheath 24 terminating in the manipulation knob 25. The sheath encloses the inner portion of the shaft 16 which is provided close to that end with opposed lateral bosses 26 between which and the confronting face of the disc 21 is interposed the helical expansion spring 27, which is normally relaxed. The bosses 26 extend through slots 28 in the sheath and the sliding range of the sheath is limited by the length of these slots since the shaft 16 is fixed as against longitudinal movement. The shaft 16 is revolved in either direction, however, by means of the sheath 24 through the applied pressure of the sides of the slots 28 against said bosses.

The disc 21 is provided with a lug 29 adapted to selectively engage conforming sockets 30 in the selector plate 19, which are three in number corresponding to the three positions of the signal, and which are, of course, annularly aligned.

The lug 29 may be withdrawn from any one of these sockets and selectively engaged with another of them by manipulation of the knob 25, first by the operator drawing the knob toward him against the tension of the spring 27, next rotating it a quarter turn in the desired direction and finally releasing it so that the lug will engage the desired socket under urge of said spring.

The end of the shaft 16 within the gear box 12 is provided with a drive bevel pinion 31 constantly in mesh with the pinion 15.

The lowermost of the sockets 30 is, of course the neutral, and when the lug 29 is engaged in that socket the signal will be pointing ahead, but when the lug is engaged in either of the lateral sockets 30 the signal will point to the right or left, as the case may be.

For the automatic illumination of the signal at night there are provided the incandescent lamps 32 depending from brackets 33 mounted on top of the shaft 10 and which also support a canopy 34 for the purpose of sheltering the lamps and reflecting the rays thereof on the signal. The lamps are the single contact type and hence a single feed wire is here shown, although it will be understood if deemed advisable that the double system could be utilized.

The insulated feed wire 35 to the lamps is trained through the core of the shaft 10 with an entrance gained thereto through an orifice 36 inside the gear box 12. This wire is here connected to a terminal 37 insulated from but carried by the shaft. In the gear box is a bracket formed of a section of channel opening outwardly and through the flanges 38 of which pass the shaft 10 for additional bearing support. Similarly the end of the shaft 16 has additional bearing in the web 39 of the channel.

The channel web 39 carries laterally spaced fixed terminals 40 flanking the shaft 10 and connected by the bus bar 41, one said terminal 40 being connected to the wire 42 leading out to the line. When the signal is turned to right or left position contact is made between one of the fixed terminals 40 and the terminal 37 thus energizing the lamps 32, and it follows that when the signal is again turned to neutral position the line will open and the lamps will be extinguished.

There has thus been provided a simple and efficient device of the kind described and for the purpose specified.

It is obvious that minor changes may be made in the form and construction of the invention without departing from the spirit thereof. It is not, therefore, desired to confine the invention to the exact form herein shown and described, but it is desired to include all such as properly come within the scope claimed.

Having thus described the invention, what is claimed as new, is:

In a direction indicator, a shaft journalled in bearings mounted on a vehicle and fixed in position longitudinally, a multi-position signal operated to alter its position by means of the rotation of said shaft, a fixed selector plate having selector sockets equal in number to the positions of the signal and in annular alignment, a sheath enclosing the free end of said shaft and provided with longitudinal slots, bosses on the shaft engaging in said slots, a closure on the end of the sheath next said plate, an expansion spring interposed between said bosses and said closure, and a selector lug rigidly connected to the sheath adapted to selectively engage with said sockets.

GEORGE F. WEBB.